United States Patent [19]
Hirofumi et al.

[11] Patent Number: 4,956,595
[45] Date of Patent: Sep. 11, 1990

[54] DRIVING CIRCUIT FOR A FIVE-PHASE STEPPING MOTOR

[75] Inventors: Satomi Hirofumi; Domeki Hideo, both of Kashiwa, Japan

[73] Assignee: Oriental Motors Corp., Ltd., Tokyo, Japan

[21] Appl. No.: 191,416

[22] Filed: May 9, 1988

[30] Foreign Application Priority Data

Oct. 16, 1987 [JP] Japan .................................. 62-261315

[51] Int. Cl.⁵ .............................................. H02P 8/00
[52] U.S. Cl. ..................................... 318/696; 318/685
[58] Field of Search .................................. 318/696, 685

[56] References Cited

U.S. PATENT DOCUMENTS

| | | | |
|---|---|---|---|
| 3,842,332 | 10/1974 | Heine et al. | 318/696 |
| 4,603,287 | 7/1986 | Setoya | 318/696 |
| 4,607,204 | 8/1986 | Setoya | 318/696 |
| 4,663,577 | 5/1987 | Satomi | 318/696 |
| 4,739,239 | 4/1988 | Krause et al. | 318/685 |

Primary Examiner—William M. Shoop, Jr.
Assistant Examiner—Saul M. Bergmann
Attorney, Agent, or Firm—Stanger, Michaelson, Reynolds, Spivak & Tobia

[57] ABSTRACT

A driving circuit for a five-phase stepping motor includes five phase-windings each having a starting end and a terminating end in which each of the starting ends is successively connected to each of the terminating ends to form a ring, pairs of switching elements connected in series to each other and each pair of which includes a connection therebetween which is connected to each of junctions between the phase-windings and in which one of each pair of the switching elements is connected to the positive pole of a driving power source and the other of each pair of the switching elements is connected to the negative pole of the power source so that the switching elements are turned on and off to connect the junctions to the positive or negative pole of the power source or not to connect the junctions to any pole of the power source, and the junctions connected to the positive pole and the negative pole of the driving power source are changed when the stepping motor is driven so that various controls are attained.

6 Claims, 14 Drawing Sheets

|  | 1 | 2 | 3 | 4 | 5 | 6 | 7 | 8 | 9 | 10 | 11 | 12 | 13 | 14 | 15 | 16 | 17 | 18 | 19 | 20 | 1 |
|---|---|---|---|---|---|---|---|---|---|---|---|---|---|---|---|---|---|---|---|---|---|
| T1 | ○ | ○ | ○ | ○ | ○ |  |  |  |  |  |  |  |  |  |  |  |  |  | ○ | ○ | ○ |
| T2 |  | ○ | ○ | ○ | ○ | ○ | ○ | ○ |  |  |  |  |  |  |  |  |  |  |  |  |  |
| T3 |  |  |  | ○ | ○ | ○ | ○ | ○ | ○ | ○ |  |  |  |  |  |  |  |  |  |  |  |
| T4 |  |  |  |  |  |  | ○ | ○ | ○ | ○ | ○ | ○ | ○ |  |  |  |  |  |  |  |  |
| T5 | ○ |  |  |  |  |  |  |  |  |  |  |  |  |  | ○ | ○ | ○ | ○ | ○ | ○ | ○ |
| T6 |  |  |  |  | ○ | ○ | ○ | ○ | ○ | ○ | ○ |  |  |  |  |  |  |  |  |  |  |
| T7 |  |  |  |  |  |  |  |  |  |  |  |  | ○ | ○ | ○ | ○ | ○ | ○ | ○ |  |  |
| T8 | ○ | ○ | ○ |  |  |  |  |  |  |  |  |  |  |  |  | ○ | ○ | ○ | ○ | ○ |  |
| T9 | ○ | ○ | ○ | ○ | ○ | ○ | ○ |  |  |  |  |  |  |  |  |  |  |  |  |  | ○ |
| T10 |  |  | ○ | ○ | ○ | ○ | ○ | ○ |  |  |  |  |  |  |  |  |  |  |  |  |  |

| | 1 | 2 | 3 | 4 | 5 | 6 | 7 | 8 | 9 | 10 | 11 | 12 | 13 | 14 | 15 | 16 | 17 | 18 | 19 | 20 | 1 |
|---|---|---|---|---|---|---|---|---|---|---|---|---|---|---|---|---|---|---|---|---|---|
| T1 | ○ | ○ | | ○ | ○ | ○ | ○ | | | | | | | | | | | | | | |
| T2 | | | ○ | ○ | ○ | ○ | | | ○ | ○ | ○ | ○ | | | | | | | | | |
| T3 | | | | | | ○ | ○ | ○ | ○ | | | ○ | ○ | ○ | ○ | | | | | | |
| T4 | | | | | | | | | ○ | ○ | ○ | ○ | | | ○ | ○ | ○ | ○ | | | |
| T5 | ○ | ○ | ○ | | | | | | | | | | ○ | ○ | ○ | ○ | | | ○ | ○ | |
| T6 | | | | | | | ○ | ○ | ○ | ○ | | | ○ | ○ | ○ | ○ | | | | | |
| T7 | ○ | | | | | | | | | | | | ○ | ○ | ○ | ○ | | ○ | ○ | ○ | ○ |
| T8 | | | ○ | ○ | ○ | ○ | | | | | | | | | | | ○ | ○ | ○ | ○ | |
| T9 | ○ | ○ | ○ | ○ | | ○ | ○ | ○ | ○ | | | | | | | | | | | ○ | |
| T10 | | | ○ | ○ | ○ | ○ | | ○ | ○ | ○ | ○ | | | | | | | | | | |

(a)   (b)   (c)   (d)

|     | 1 | 2 | 3 | 4 | 5 | 6 | 7 | 8 | 9 | 10 | 11 | 12 | 13 | 14 | 15 | 16 | 17 | 18 | 19 | 20 | 1 |
|-----|---|---|---|---|---|---|---|---|---|----|----|----|----|----|----|----|----|----|----|----|---|
| T1  | O | O |   |   |   |   |   |   |   |    |    |    |    |    |    | O  | O  | O  | O  | O  | O |
| T2  | O | O | O | O | O | O |   |   |   |    |    |    |    |    |    |    |    |    | O  | O  |   |
| T3  |   |   | O | O | O | O | O | O | O |    |    |    |    |    |    |    |    |    |    |    |   |
| T4  |   |   |   |   |   | O | O | O | O | O  | O  | O  |    |    |    |    |    |    |    |    |   |
| T5  |   |   |   |   |   |   |   |   | O | O  | O  | O  | O  | O  | O  |    |    |    |    |    |   |
| T6  |   |   |   |   | O | O | O | O | O | O  | O  |    |    |    |    |    |    |    |    |    |   |
| T7  |   |   |   |   |   |   |   | O | O | O  | O  | O  | O  | O  |    |    |    |    |    |    |   |
| T8  |   |   |   |   |   |   |   |   |   |    | O  | O  | O  | O  | O  | O  | O  |    |    |    |   |
| T9  | O | O | O | O |   |   |   |   |   |    |    |    |    |    |    |    | O  | O  | O  | O  |   |
| T10 | O | O | O | O | O | O | O |   |   |    |    |    |    |    |    |    |    |    |    |    |   |

|  | 1 | 2 | 3 | 4 | 5 | 6 | 7 | 8 | 9 | 10 | 11 | 12 | 13 | 14 | 15 | 16 | 17 | 18 | 19 | 20 | 1 |
|---|---|---|---|---|---|---|---|---|---|---|---|---|---|---|---|---|---|---|---|---|---|
| T1 | ○ | ○ |  |  |  |  |  |  |  |  |  |  |  |  |  |  |  | ○ | ○ | ○ | ○ |
| T2 |  | ○ | ○ | ○ | ○ | ○ |  |  |  |  |  |  |  |  |  |  |  |  |  |  |  |
| T3 |  |  |  | ○ | ○ | ○ | ○ | ○ |  |  |  |  |  |  |  |  |  |  |  |  |  |
| T4 |  |  |  |  |  |  | ○ | ○ | ○ | ○ | ○ |  |  |  |  |  |  |  |  |  |  |
| T5 |  |  |  |  |  |  |  |  |  |  | ○ | ○ | ○ | ○ | ○ |  |  |  |  |  |  |
| T6 |  |  |  |  |  | ○ | ○ | ○ | ○ | ○ |  |  |  |  |  |  |  |  |  |  |  |
| T7 |  |  |  |  |  |  |  |  | ○ | ○ | ○ | ○ | ○ |  |  |  |  |  |  |  |  |
| T8 |  |  |  |  |  |  |  |  |  |  |  |  | ○ | ○ | ○ | ○ | ○ |  |  |  |  |
| T9 | ○ | ○ | ○ | ○ |  |  |  |  |  |  |  |  |  |  |  |  |  |  | ○ | ○ |  |
| T10 |  | ○ | ○ | ○ | ○ | ○ |  |  |  |  |  |  |  |  |  |  |  |  |  |  |  |

|     | 1 | 2 | 3 | 4 | 5 | 6 | 7 | 8 | 9 | 10 | 11 | 12 | 13 | 14 | 15 | 16 | 17 | 18 | 19 | 20 | 1 |
|-----|---|---|---|---|---|---|---|---|---|----|----|----|----|----|----|----|----|----|----|----|---|
| T1  | o | o | o |   |   |   |   |   |   |    |    |    |    |    |    |    |    | o  | o  | o  |   |
| T2  |   | o | o | o | o | o |   |   |   |    |    |    |    |    |    |    |    |    |    |    |   |
| T3  |   |   |   |   | o | o | o | o | o |    |    |    |    |    |    |    |    |    |    |    |   |
| T4  |   |   |   |   |   |   |   |   | o | o  | o  | o  | o  |    |    |    |    |    |    |    |   |
| T5  |   |   |   |   |   |   |   |   |   |    |    | o  | o  | o  | o  | o  |    |    |    |    |   |
| T6  |   |   |   |   |   |   | o | o | o | o  | o  |    |    |    |    |    |    |    |    |    |   |
| T7  |   |   |   |   |   |   |   |   |   | o  | o  | o  | o  | o  |    |    |    |    |    |    |   |
| T8  | o |   |   |   |   |   |   |   |   |    |    |    |    |    |    | o  | o  | o  | o  | o  |   |
| T9  | o | o | o | o | o |   |   |   |   |    |    |    |    |    |    |    |    |    |    | o  |   |
| T10 |   |   |   | o | o | o | o | o |   |    |    |    |    |    |    |    |    |    |    |    |   |

|     | 1 | 2 | 3 | 4 | 5 | 6 | 7 | 8 | 9 | 10 | 11 | 12 | 13 | 14 | 15 | 16 | 17 | 18 | 19 | 20 | 1 |
|-----|---|---|---|---|---|---|---|---|---|----|----|----|----|----|----|----|----|----|----|----|---|
| T1  | o | o |   |   |   |   |   |   |   |    |    |    |    | o  | o  | o  | o  | o  | o  | o  | o |
| T2  | o | o | o | o | o | o |   |   |   |    |    |    |    |    |    |    | o  | o  | o  | o  |   |
| T3  |   | o | o | o | o | o | o | o | o | o  |    |    |    |    |    |    |    |    |    |    |   |
| T4  |   |   |   |   | o | o | o | o | o | o  | o  | o  | o  |    |    |    |    |    |    |    |   |
| T5  |   |   |   |   |   |   |   | o | o | o  | o  | o  | o  | o  | o  | o  |    |    |    |    |   |
| T6  |   | o | o | o | o | o | o | o | o | o  |    |    |    |    |    |    |    |    |    |    |   |
| T7  |   |   |   |   |   | o | o | o | o | o  | o  | o  | o  | o  |    |    |    |    |    |    |   |
| T8  |   |   |   |   |   |   |   |   |   | o  | o  | o  | o  | o  | o  | o  | o  | o  |    |    |   |
| T9  | o | o | o | o |   |   |   |   |   |    |    |    |    |    | o  | o  | o  | o  | o  | o  |   |
| T10 | o | o | o | o | o | o | o | o |   |    |    |    |    |    |    |    |    |    | o  | o  |   |

DRIVING CIRCUIT FOR A FIVE-PHASE STEPPING MOTOR

FIELD OF THE INVENTION AND RELATED ART STATEMENT

The present invention relates to a driving circuit for a five-phase stepping motor and more particularly to a driving circuit capable of driving a five-phase stepping motor in a half-step movement.

As driving methods of a five-phase stepping motor, there are proposed a standard driving method, a pentagon driving method and a star driving method. A four-and-five-phase excitation method by the standard driving method is generally carried out as a method of performing a half-step movement.

FIG. 19 is a circuit diagram of the excitation method described above, in which $\phi 1$ to $\phi 5$ denote five phase-windings of a five-phase stepping motor, T1 to T10 denote switching elements for connecting a starting end or terminating end of each of the phase-windings to the positive pole of a power source, and T11 to T20 denote switching transistor for connecting the starting end or the terminating end of each of the phase-windings to the negative pole of the power source. In order to perform the half-step movement, it is necessary to control the switching elements T11 to T20 so that one state where four phase-windings are excited and the other state where five phase-windings are excited are repeated alternately each time a pulse is supplied.

The driving method described above requires twenty switching transistors T1 to T20 at the output stage, resulting in a complicated or expensive circuit configuration. Further, the power source requires a current capacity greater than four or five times the rated current of the winding. Since the number of connecting wires between the motor and the driving circuit is ten, the connection whork thereof is complicated and troublesome and hence there are various problems in practice. Japanese Patent Application No. 271317/84 discloses a driving circuit for a stepping motor which reduces the number of switching elements consisting of the driving circuit to attain simplification of the circuit configuration and reduction of the connection work and reduces the power capacity of the driving circuit to about twice the rated current of the winding to obtain the satisfactory practicality. FIGS. 20 to 25 show the configuration and the driving operation of the driving circuit.

In FIG. 20, $\phi 1$ to $\phi 5$ denote phase-windings for five phases which are connected to each other through junctions 1 to 5. These windings are connected in the form of ring successively from each of the starting ends thereof to each of the terminating ends thereof so that vectors A, B, C, D and E shifted by 72 degrees in an electric angle are formed when a circulating current flows. T1 to T5 and T6 to T10 denote switching elements for connecting these windings to the positive pole and the negative pole of a driving power source separately through the five junctions 1 to 5 of the windings. As shown in FIG. 20, respectively pairs of the switching elements T1 and T6; T2 and T6; t3 and T7; T4 and T9; and T5 and T10 are connected in series to each other and the respective connections between the respective pairs of the elements are connected to the corresponding junctions of the windings, respectively.

FIGS. 21 and 22 are timing charts showing operation of the driving circuit constructed above. In step 1, the switching elements T1, T8 and T9 are turned on to connect the junction 1 between the windings $\phi 1$ and $\phi 5$ to the positive pole of the power source and to connect the junction 3 between the windings $\phi 2$ and $\phi 3$ and the junction 4 between the windings $\phi 3$ and $\phi 4$ to the negative pole of the power source so that a so-called four-phase excitation state is formed. Then, in step 2, since the switching elements T1 and T9 are turned on, the junction 1 is connected to the positive pole of the power source and the junction 4 is connected to the negative pole so that a so-called five-phase excitation state is formed. Further, in step 3, since the switching elements T1, T2 and T9 are turned on, the junctions 1 and 2 are connected to the positive pole and the junction 4 is connected to the negative pole so that the four-phase excitation state is formed again. Thus, the four-phase and five-phase excitation states are successively repeated in steps 4 to 20 in the same manner.

FIG. 23 is a circuit diagram in which the phase-windings $\phi 1$ to $\phi 5$ are so connected that one ends of the windings are commonly connected to one point to produce torque vectors A, B, C, D and E shifted by 72 degrees in an electric angle when currents flow into the common junction. The other ends of the windings are connected to the connections between the switching elements connected in series in the same manner as that of FIG. 20.

As apparent from timing charts shown in FIGS. 24 and 25, even in the driving circuit thus structured, in step 1, the switching elements T1, T2, T9 and T10 are turned on to thereby connect the windings $\phi 1$ and $\phi 2$ to the positive pole of the power source and connect the windings $\phi 4$ and $\phi 100\ 5$ to the negative pole of the power source so that the four-phase excitation state is formed while, in step 2, the switching elements T1, T2, T3, T9 and T10 are turned on to thereby connect the windings $\phi 1$, $\phi 2$ and $\phi 3$ to the positive pole of the power source and connect the windings $\phi 4$ and $\phi 5$ to the negative pole of the power source so that the state of the circuit proceeds to the five-phase excitation state. Further, in step 3, the switching elements T2, T3, T9 and T10 are turned on to thereby connect the windings elements $\phi 2$ and $\phi 3$ to the positive pole of the power source and connect the windings $\phi 4$ and $\phi 5$ to the negative pole of the power source so that the circuit is returned to the four-phase excitation state. In this manner, the four-and five-phase excitation states are alternately repeated successively in the following steps.

In the driving circuit shown in FIGS. 20 to 22, a ratio of a torque produced in the five-phase excitation and a torque produced in the four-phase excitation in a so-called common constant current drive in which a total current which flows into the driving circuit from the positive pole of the power source is controlled to a constant value is equal to 1.05 and its difference is as very small as 5%, while a ratio of a torque produced in the four-phase excitation and a torque produced in the five-phase excitation in a constant voltage drive is equal to 1.14 and the difference thereof is 14%.

In the driving circuit shown in FIGS. 23 to 25, a ratio of a torque produced in the five-phase excitation and a torque prouced in the four-phase excitation in the constant voltage drive is equal to 1.05 and its difference is as very small as 5%, while a ratio of a torque produced in the four-phase excitation and a torque produced in the five-phase excitation in the common constant current drive is equal to 1.14 and the difference thereof is 14%.

OBJECT AND SUMMARY OF THE INVENTION

It is an object of the present invention to solve the problem described above and provide a driving circuit for a five-phase stepping motor capable of reducing a difference of torques produced in the constant voltage drive or the common constant current drive and improving the drive efficiency.

In order to solve the above problem, the present invention is provided with the following configuration.

A driving circuit for a five-phase stepping motor according to the first embodiment of the invention including five phase-windings each having a starting end and a terminating end in which each of the starting ends is successively connected to each of the terminating ends to form a ring, pairs of switching means connnected in series to each other and each pair of which includes a connection therebetween which is connected to each of junctions between the phase-windings and in which one of each pair of the switching means is connected to the positive pole of a driving power source and the other of each pair of the switching means is connected to the negative pole of the power source so that the switching means are turned on an off to connect the junctions to the positive or negative pole of the power source or not to connect the junctions to any pole of the power source, controls to drive the five-phase stepping motor so that the total number of the junctions connected to the positive or negative pole of the power source is equal to four, or one state in which the total number of the junctions connected to the positive or negative pole of the power source is equal to three and the other state in which the total number of the junctions connected to the positive or negative pole of the power source is equal to four are alternately repeated each time an input pulse is supplied.

A driving circuit for a five-phase stepping motor according to the second embodiment of the invention including five phase-windings each having a starting end and a terminating end in which each of the starting ends is successively connected to each of the terminating ends to form a ring, pairs of switching means connected in series to each other and each pair of which includes a connnection therebetween which is connected to each of junctions between the phase-windings and in which one of each pair of the switching means is connected to the positive pole of a driving power source and the other of each pair of the switching means is connected to the negative pole of the source so that the switching means are turned on and off to connect the junctions to the positive or negative pole of the power source or not to connect the junctions to any pole of the power source, controls to drive the five-phase stepping motor so that two of the junctions are connected to the positive pole of the power source and other two of the junctions are connected to the negative pole of the power source with a remaining junction being not connected to both the poles of the power source to be opened thereto one state in which one ends of two phase-windings each having the other end connected to the remaining junction are connected to the same positive pole of the power source and the other state in which one ends of two phase-windings each having the other end connected to the remaining junction are connected to the same negative pole of the power source are alternately repeated.

A driving circuit for a five-phase stepping motor according to the third embodiment of the invention including five phase-windings each having a starting end and a terminating end in which each of the starting ends is successively connected to each of the terminating ends to form a ring, pairs of switching means connected in series to each other and each pair of which includes a connection therebetween which is connected to each of junctions between the phase-windings and in which one of each pair of the switching means is connected to the positive pole of a driving power source and the other of each pair of the switching means is connected to the negative pole of the power source so that the switching means are turned on and off to connect the junctions to the positive or negative pole of the power osurce or not to connect the junctions to any pole of the power source, controls to drive the five-phase stepping motor so that two of the junctions are connected to the positive pole of the power source and other two of the junctions are connected to the negative pole of the power source with a remaining junction being not connected to both the poles of the power source to be opened thereto while one of one ends of two phase-windings each having the other end connected to the remaining junction is connected to the positive pole of the power source and the other of one ends of the two phase-windings is connected to the negative pole of the power source.

A driving circuit for a five-phase stepping motor according to the fourth embodiment of the invention including five phase-windings each having a starting end and a terminating end in which each of the starting ends is successively connected to each of the terminating ends to form a ring, pairs of switching means connected in series to each other and each pair of which includes a connection therebetween which is connected to each of junctions between the phase-windings and in which one of each pair of the switching means is connected to the positive pole of a driving power source and the other of each pair of the switching means is connected to the negative pole of the source so that the switching means are turned on and off to connect the junctions to the positive or negative pole of the power source or not to connect the junctions to any pole of the power source, controls to drive the five-phase stepping motor so that two of the junctions are connected to the positive pole of the power source and other two of the junctions are connected to the negative pole of the power source with a remaining junction being not connected to both the poles of the power source to be opened thereto while one state in which one ends of two phase-windings each having the other end connected to the reaiming junction are connected to the same positive or negative pole of the power source and the other state in which one of one ends of two phase-windings each having the other end connected to the reaiming junction is connected to the positive pole of the power source and the other of one ends of two phase-windings is connected to the negative pole of the power source are alternately repeated.

A driving circuit for a five-phase stepping motor according to the firth embodiment of the invention including five phase-windings each having a starting end or a terminating end connected in common and the other end connected to switching means separately so that each of the other ends of the phase-windings is connected to the positive pole or the negative pole of a driving power source through the switching means or not connected to any pole of the power source, controls to drive the five-phase stepping motor so that the total number of the other ends connected to the positive pole and the negative pole of the power source is equal to three, or one state in which the total number is equal to three and the other state in which the total number is equal to four are alternately repeated each time an input pulse is supplied.

A driving circuit for a five-phase stepping motor according to the sixth embodiment of the invention including five phase-windings each having a starting end or a terminating end connected in common and the other end connected to switching means separately so that each of the other ends of the phase-windings is connected to the positive pole or the negative pole of a driving power source through the switching means or not connected to any pole of the power source, controls to drive the five-phase stepping motor so that the total number of the other ends connected to the positive pole and the negative pole of the power source is equal to two or three, or one state in which the total number is equal to two and the other state in which the total number is equal to three are alternately repeated each time an input pulse is supplied.

According to the present invention, a so-called half-step driving operation can be attained exactly with two switching elements per phase which drive the phase-windings of the five-phase stepping motor and accordingly it is practically advantageous that the circuit configuration can be simplified greatly. Such simplification of the circuit configuration minimizes the number of leads for the motor and work of connecting between the driving circuit and the motor is reduced. Further, since the phase-windings of the five-phase stepping motor are connected in series and parallel across the driving power source, the capacity of the power source can be suppressed to about twice the rated current of the phase-winding.

In the case of the half-step driving operation the system disclosed in Japanese Patent Application No. 271317/84 has a ratio of 1.05 between a torque produced in the five-phase excitation and a torque produced in the four-phase excitation in the common constant current drive and a torque difference which is a very small as 5%, while, in the constant voltage drive, the system has a ratio of 1.14 between a torque produced in the four-phase excitation and a torque produced in the five-phase excitation and the torque difference thereof of 14%, which is disadvantageous. However, the driving circuit according to the second and third embodiment of the invention is employed to be able to reduce the ratio between the torque produced in the two-phase excitation and the torque produced in the three-phase excitation to 1.05 . Furthermore, in the half-step driving, the system disclosed in Japanese Patent Application No. 271317/84 has a ratio of 1.05 between a torque produced in the five-phase excitation and a torque produced in the four-phase excitation in the constant voltage drive and the torque difference thereof which is as very small as 5%, while, in the common constant current drive, the system has a ratio of 1.14 between a torque produced in the five-phase excitation and a torque produced in the four-phase excitation and the torque difference thereof of 14%, which is disadvantageous. However, the driving circuit according to the fifth invention is employed to be able to reduce the ratio between the torque produced in the two-phase excitation and the torque produced in the three-phase excitation to 1.05 and accordingly the torque ripple in the half-step driving can be reduced and further vibration can be reduced. In addition, the stepping accuracy in the half-step driving operation can be improved.

DETAILED DESCRIPTION OF PREFERRED EMBODIMENTS

Preferred embodiment of the present invention are described in detail with reference to drawings.

Figure 1:
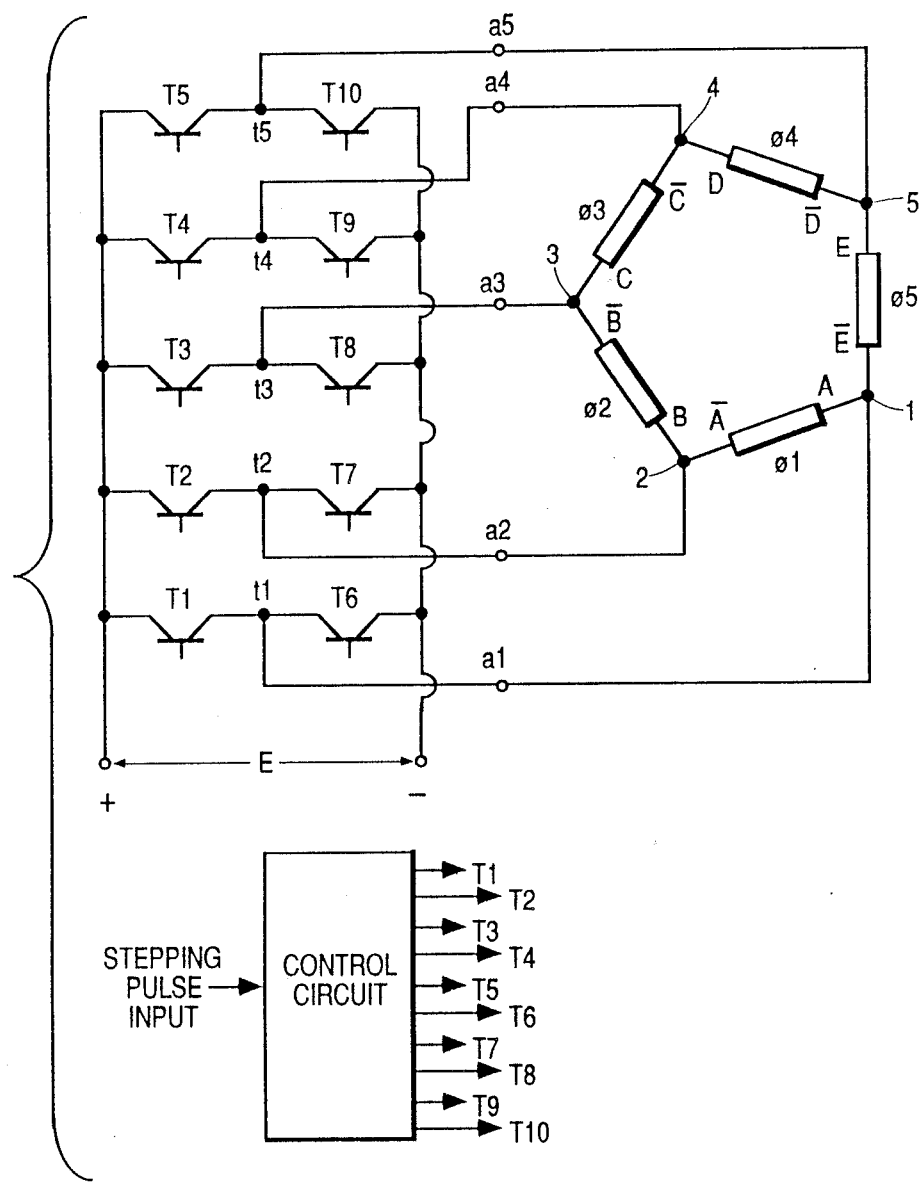
FIG. 1 is a circuit diagram of a driving circuit for a five-phase stepping motor configured in accordance with the present invention.

Referring to FIG. 1 showing a driving circuit for a five-phase stepping motor according to the first to fourth embodiments of the invention including phase-windings connected in the form of pentagon, the phase-windings $\phi 1$ to $\phi 5$ of the five-phase stepping motor are connected with one another through junctions 1 to 5. The phase-windings $\phi 1$ to $\phi 5$ are connected in the form of ring by connecting each of starting ends A to E thereof to each of terminating ends A' to E' thereof so that torque vectors A, B, C, D and E shifted by 72 degrees in an electric angle are formed when a circulating current flows through the phase-windings $\phi 1$ to $\phi 5$. Switching elements T1 to T5 and T6 and T10 connect the five junctions 1 to 5 of the phase-windings $\phi 1$ to $\phi 5$ to the positive pole and the negative pole of a driving power source separately. These elements T1 and T6, T2 and T7, T3 and T8, T4 and T9, and T5 and T10 are connected in series to each other, respectively a control circuit CC responds to a stepping pulse input to energize the control electrodes of switching elements T1 to T10, and connections t1 to t5 therebetween are connected to the corresponding junctions 1 to 5 of the phase-winding, respectively.

Figures 2, 3:
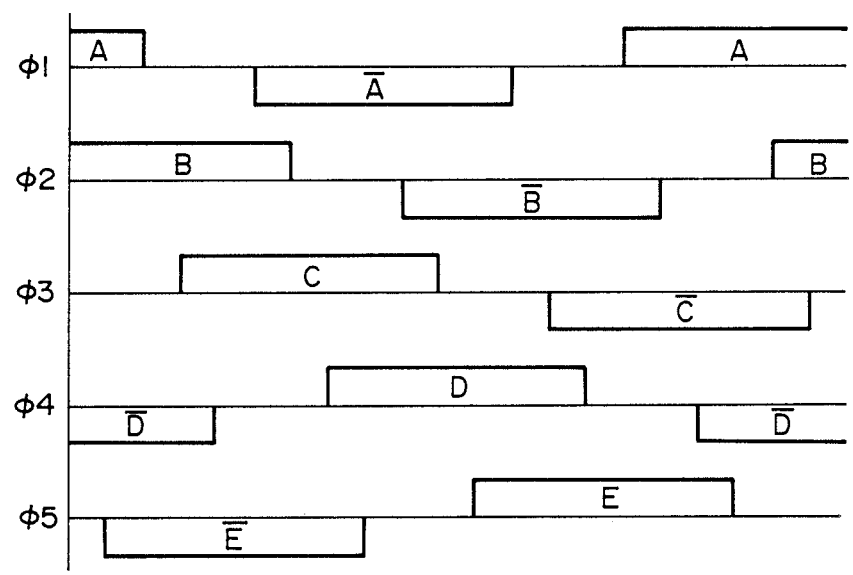
FIG. 2 is a timing chart showing conductive states of switching elements for each step in the first invention according to the circuit configuration of FIG. 1.
FIG. 3 is a timing chart showing excitation state of phase-windings of the five-phase stepping motor corresponding to the conductive states of FIG. 2.

FIGS. 2 and 3 are timing charts showing the pulse sequences from logic cicuit LC for operation of the first embodiment of the invention.

Referring to FIGS. 2 and 3, in step 1, the switching elements T1, T5, T8 and T9 are turned on so that the junction 1 between the windings $\phi 1$ and $\phi 5$ and the junction 5 between the windings $\phi 4$ and $\phi 5$ are connected to the positive pole of the power source E and the junction 3 between the windings $\phi 2$ and $\phi 3$ and the junction 4 between the windings $\phi 3$ and $\phi 4$ are connected to the negative pole of the power source. Consequently, the so-called three-phase excitation state is formed. Then, when the state of the circuit proceeds to step 2, since the switching elements T1, T8 and T9 are turned on, the junction 1 is connected to the positive pole of the power source and the junctions 3 and 4 are connected to the negative pole so that a so-called four-phase excitation state is formed. Further, in step 3, since the switching elements T1, T2, T8 and T9 are turned on, the junctions 1 and 2 are connected to the positive pole and the junctions 3 and 4 are connected to the negative pole so that the three-phase excitation state is formed again. Thus, the the three-phase and four-phase excitation states are alternately repeated in the following steps 4 to 20 in the same manner. Accordingly, the total number of the junctions connected to the positive pole and the negative pole of the driving power source are equal to three and four alternately and repeatedly.

Figure 4:
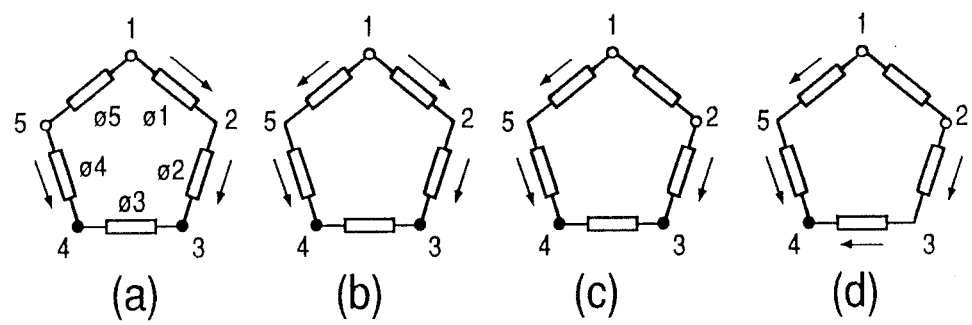
FIGS. 4(a) to (d) illustrate the phase-windings in the excitation state in accordance with the timing chart of FIG. 2.

FIG. 4 shows the excitation state for each of steps 1 to 4. In FIG. 4, small blank circles represent the junctions connected to the positive pole of the power source and black dots represent the junctions connected to the negative pole. Arrows represent flow directions of current in the respective excitation state.

Figure 5:
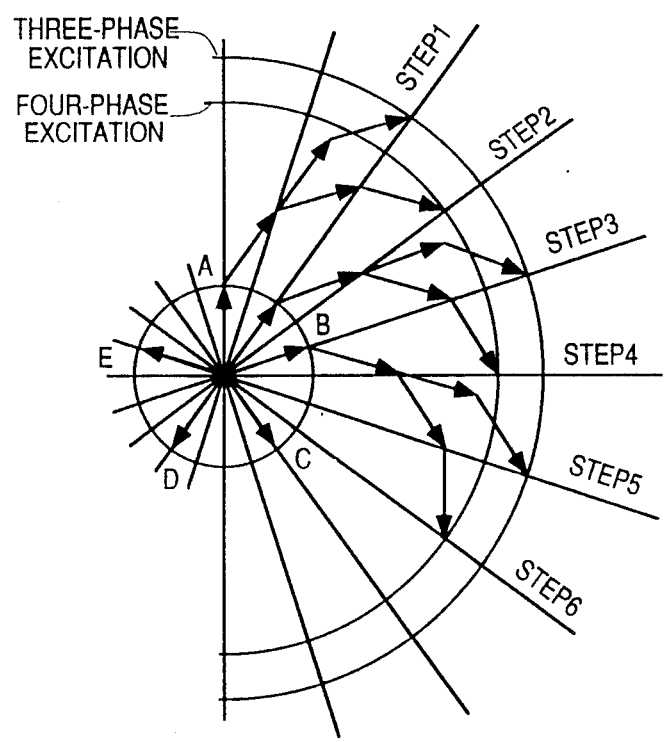
FIG. 5 is a composite torque vector diagram in the common constant current drive according to the first embodiment of the invention.

FIG. 5 is a vector diagram of torque produced when the constant voltage drive is effected by the driving circuit thus configured. As will be apparent from FIG. 5, the composite torque vector is rotated by 18 degrees in an electric angle for each step so that the so-called half-step driving is achieved. It will be appreciated that a ratio of the produced torques is equal to 1.18 so that the performance substantially identical with that of the four-and-five-phase excitation is obtained.

Figures 6, 7:
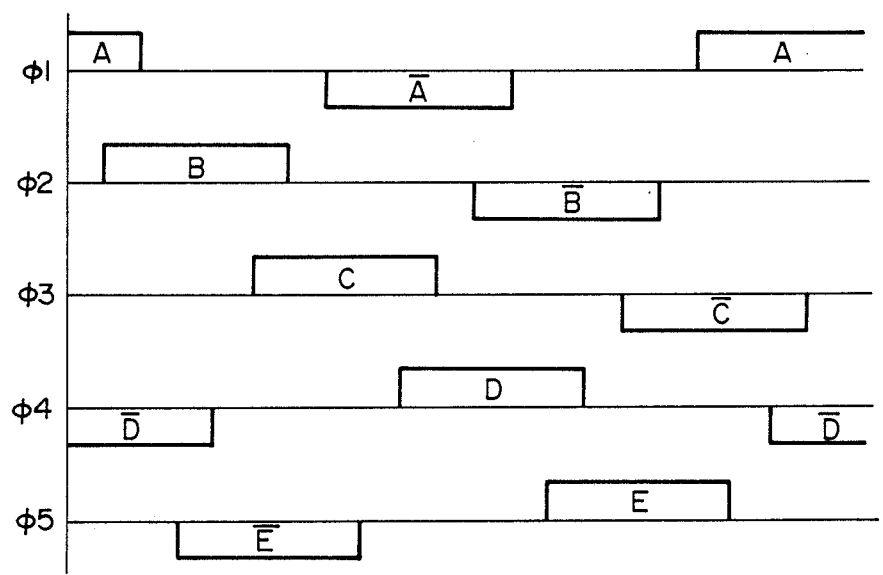
FIG. 6 is a timing chart showing conductive states of switching elements for each step in the fourth embodiment of the invention according to the circuit configuration of FIG . 1.
FIG.7 is a timing chart showing excitation state of phase-windings of the five-phase stepping motor corresponding to the conductive states of FIG. 6.

FIGS. 6 and 7 are timing charts showing operation of the fourth embodiment of the invention. In FIGS. 6 and 7, in step 1, the switching elements T1, T5, T7 and T9 are turned on so that the junctions 1 and 5 are connected to the positive pole of the power source and the junctions 2 and 4 are connected to the negative pole of the power source. Consequently, a so-called two-phase excitation state is formed. Then, when the state of the circuit proceeds to step 2, since the switching elements T1, T5, T8 and T9 are turned on, the junctions 1 and 5 are connected to the positive pole of the power source and the junctions 3 and 4 are connected to the negative pole of the power source so that the so-called three-phase excitation state is formed.

Figure 8:
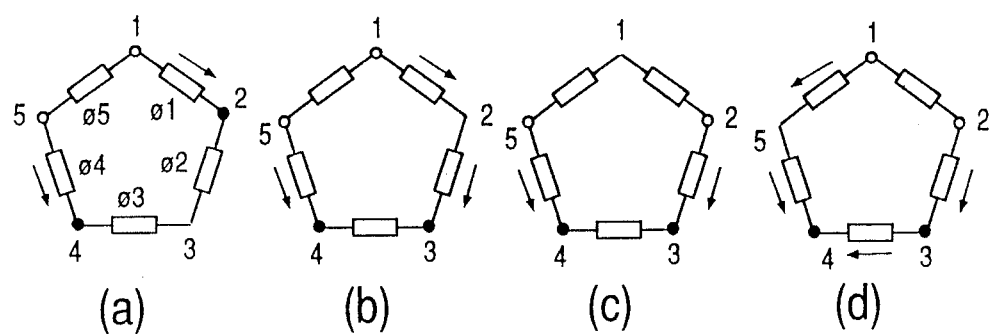
FIGS. 8(a) to (d) illustrate the phase-windings in the excitation state in accordance with the timing chart of FIG. 6.
Figure 9:
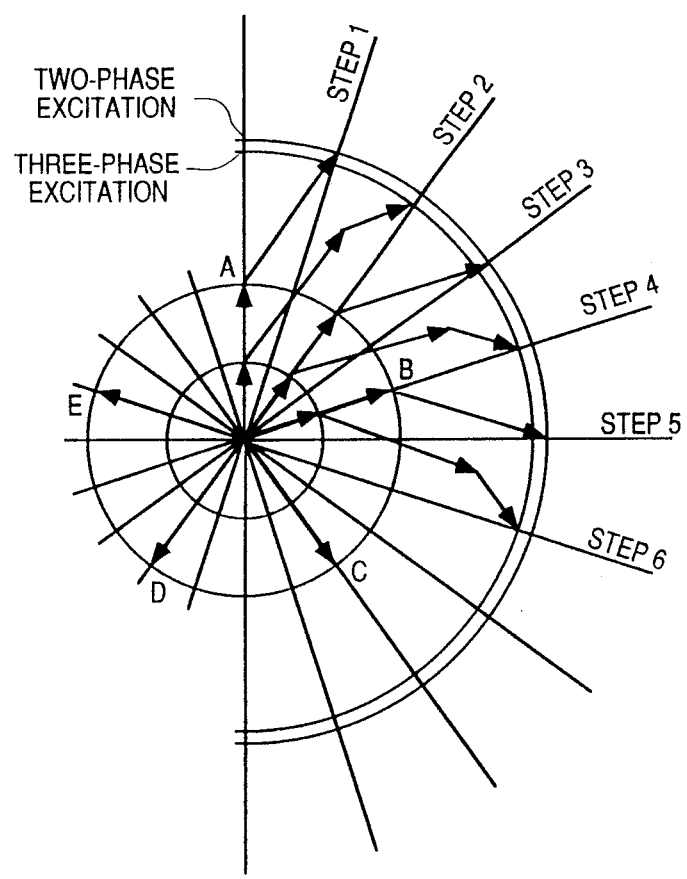
FIG. 9 is a composite torque vector diagram in the constant voltage drive according to the fourth invention.

Further, in step 3, the switching elements T2, T5, T8 and T9 are turned on so that the junctions 2 and 5 are connected to the positive pole of the power source and the junctions 3 and 4 are connected to the negative pole of the power source, whereby the two-phase excitation state is formed again. Thus, the two-phase and three-phase excitation states are alternately repeated in the following steps 4 to 20 in the same manner. As apparent from FIG. 8, the number of junctions connected to the positive pole of the power source is two and the number of junctions connected to the negative pole of the power source is also two. In step 1, the junctions 2 and 4 corresponding to one ends of two windings sharing the junction 3 in the opened state for the power source are connected to the same negative pole of the power source. In step 2, the junctions 1 and 3 corresponding to one ends of two windings sharing the junction 2 in the opened state are connected to the positive pole and the negative pole, respectively. That is, the pole to which the junction 1 is connected and the pole to which the junction 3 is connected are different from each other. In step 3, the junction 2 and 5 corresponding to one ends of two windings sharing the junction 1 in the opened state are connected to the same positive pole. In step 4, the junctions 1 and 4 corresponding to one ends of two windings sharing the junction 5 are connected to the positive pole and the negative pole, respectively. Thus, each time an input pulse is supplied, one state in which one ends of the two windings sharing the junction in the opened state are connected to the same pole of the power source and the other state in which one ends of the two windings are connected to the different pole, respectively, are alternately repeated. FIG. 9 is a vector diagram of torque produced when the constant voltage drive is effected by the driving circuit thus configured. As apparent from FIG. 9, the composite torque vector is rotated by 18 degrees in an electric angle for each step so that the so-called half-step driving is achieved. It will be appreciated that a ratio of the produced torques is equal to 1.05 and can be suppressed to the value smaller than the ratio of 1.14 which is the ratio in the four-and-five-phase excitation state.

Figure 10:
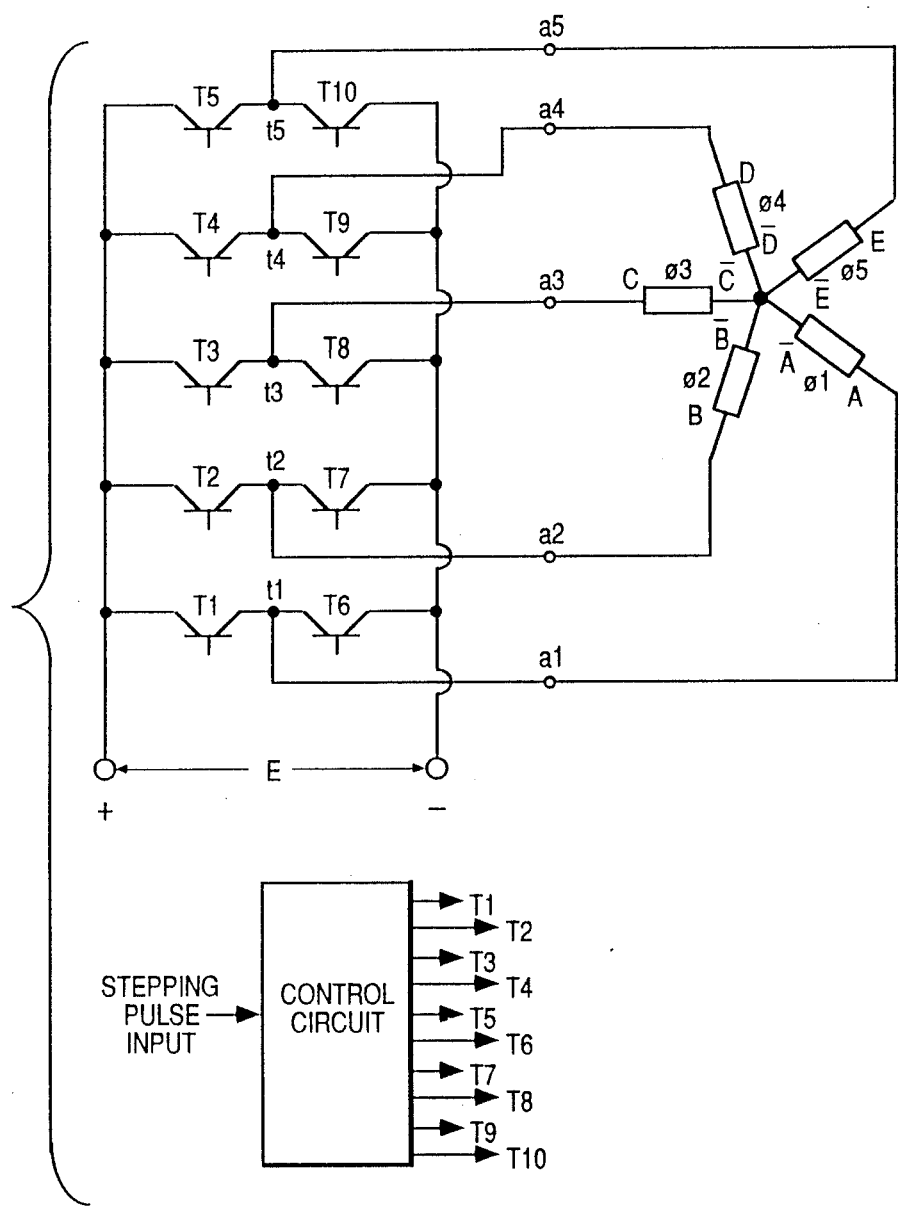
FIG. 10 is a circuit diagram of a driving circuit for a five-phase stepping motor configured in accordance with another embodiment of the present invention.

FIG. 10 shows a driving circuit for a five-phase stepping motor according to the fifth and sixth embodiment of the invention. The phase-windings $\phi 1$ to $\phi 5$ are connected in the form of star by connecting each end of the phase-windings to one point in common so that torque vectors A, B, C, D and E shifted by 72 degrees in an electric angle are produced when current flows into the common junction. The five other ends A, B, C, D and E of the phase-windings are connected to the connections t1, t2, t3, t4 and t5 of the switching elements T1 to T10, respectively, in the corresponding manner to the annular junctions 1 to 5 of FIG. 1.

Figures 11, 12:
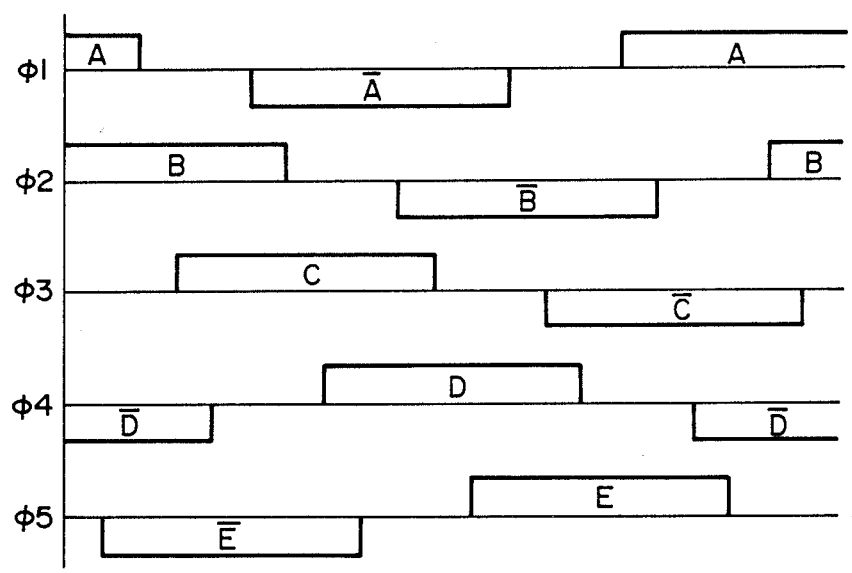
FIG. 11 is a timing chart showing conductive states of switching elements in the fifth invention according to the circuit configuration of FIG. 10.
FIG. 12 is a timing chart showing excitation state of phase-windings of the five-phase stepping motor corresponding to the conductive states of FIG. 11.

FIGS. 11 and 12 are timing charts showing operation of the fifth embodiment of the invention. In FIGS. 11 and 12, in step 1, the switching elements T1, T2 and T9 are turned on so that the winding terminals A and B are connected to the positive pole of the power source and the winding terminal D is connected to the negative pole of the power source, whereby the so-called three-phase excitation state is formed. Then, when the state of the circuit proceeds to step 2, the switching elements T1, T2, T9 and T10 are turned on so that the winding terminals A and B are connected to the positive pole of the power source and the winding terminals D and E are connected to the negative pole of the power source, whereby the so-called four-phase excitation state is formed. Further, in step 3, the switching elements T2, T9 and T10 are turned on so that the winding terminal B is connected to the positive pole of the power source and the winding terminals D and E are connected to the negative pole, whereby the three-phase excitation state is formed again. The three-phase and four-phase excitation states are alternately repeated in the following steps 4 to 20 in the same manner.

Figure 13:
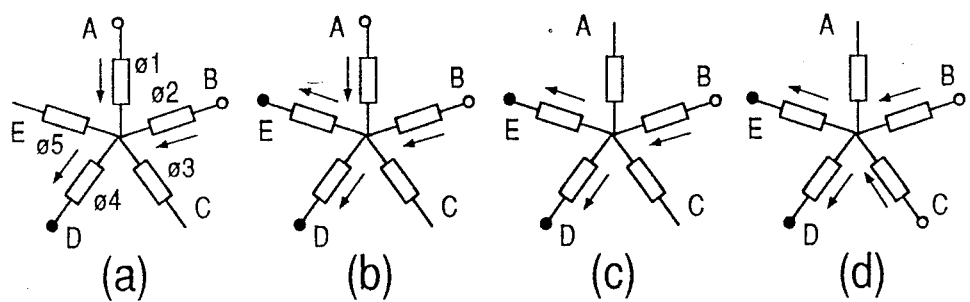
FIGS. 13(a) to (d) illustrate the phase-windings in the excitation state in accordance with the timing chart of FIG. 11.
Figure 14:
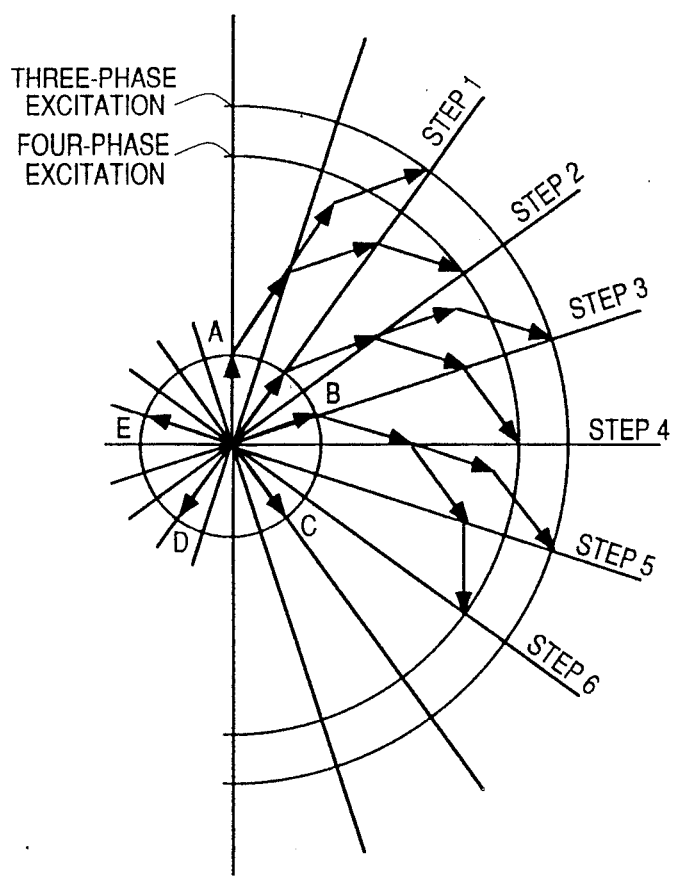
FIG. 14 is a composite torque vector diagram in the common constant current drive according to the fifth invention.

FIG. 13 shows the excitation states for each of steps 1 to 4. It will be appreciated from FIG. 13 that the total number of terminals connected to the positive and negative pole of the power source is three in step 1, four in step 2, three in step 3, four in step 4, and so on, and accordingly the total number is three or four alternately and repeatedly each time an input pulse is supplied. FIG. 14 is a vector diagram of torque produced when the common constant current drive is effected by the driving circuit thus configured. As apparent from FIG. 14, the composite torque vector is rotated by 18 degrees in an electric angle for each step so that the so-called half-step driving is achieved. It will be appreciated that a ratio of the produced torques is equal to 1.18 and so that the performance substantially identical with the ratio of 1.14 in the four-and-five-phase excitation state is obtained.

Figures 15, 16:
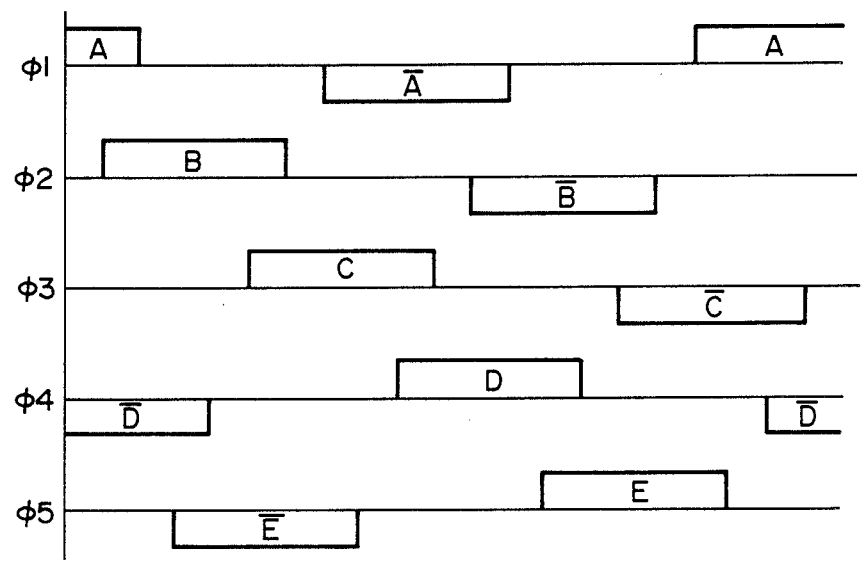
FIG. 15 is a timing chart showing conductive states of switching elements for each step in the sixth invention.
FIG. 16 is a timing chart showing excitation state of phase-windings of the five-phase stepping motor corresponding to the conductive states of FIG. 15.
Figure 17:
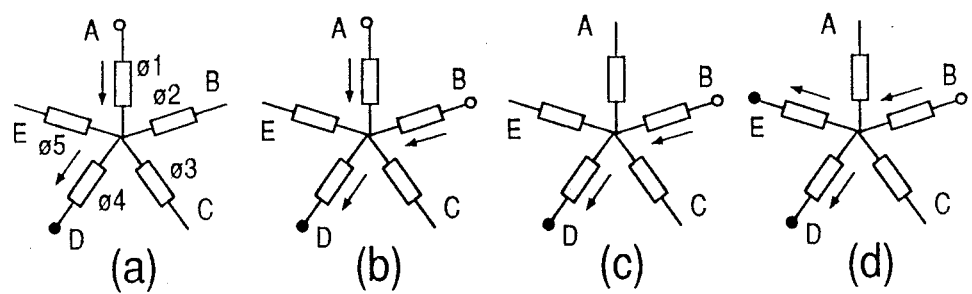
FIGS. 17(a) to (d) illustrate the phase-windings in the excitation state in accordance with the timing chart OF FIG. 15.
Figure 18:
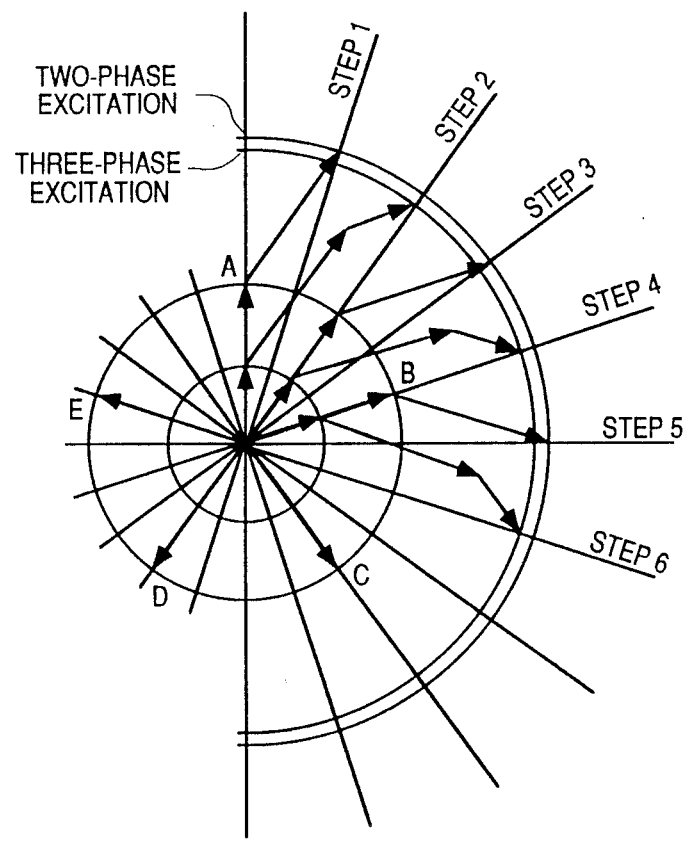
FIG. 18 is a composite torque vector diagram in the common constant current drive according to the sixth invention.
Figure 19:
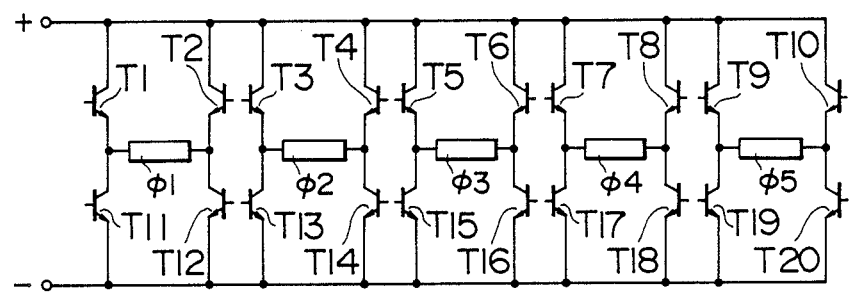
FIG. 19 is a circuit diagram of a driving circuit for a five-phase stepping motor configured to effect the half-step driving in accordance with prior art means.
Figure 20:
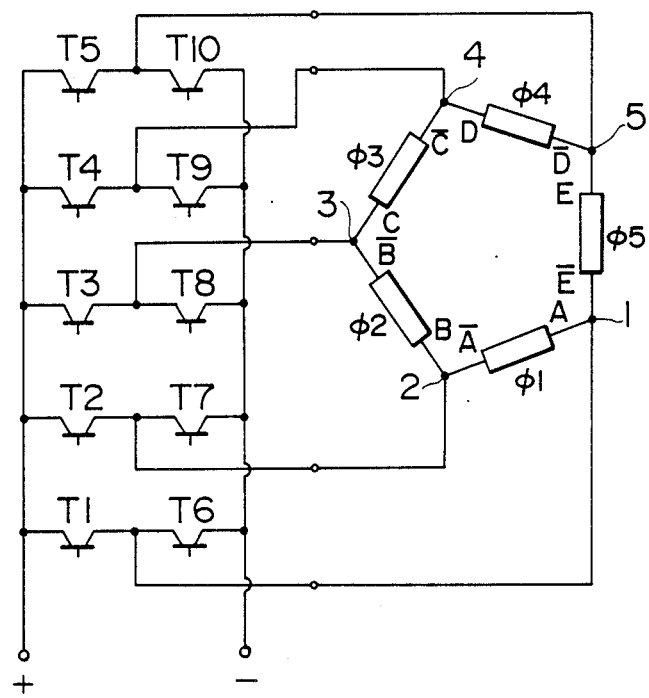
FIG. 20 is a circuit diagram of a driving circuit for a five-phase driving circuit for a five-phase stepping motor including phase-windings connected in the form of pentagon.
Figures 21, 22:
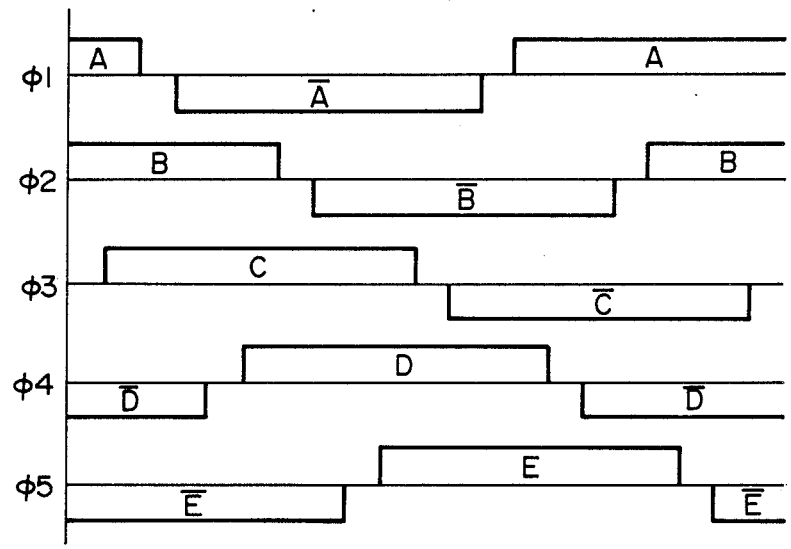
FIG. 21 is a timing chart showing conductive states of switching elements for each step in the prior art in accordance with the circuit configuration of FIG. 20.
FIG. 22 is a timing chart showing excitation state of phase-windings of the five-phase stepping motor corresponding to the conductive states of FIG. 21.
Figure 23:
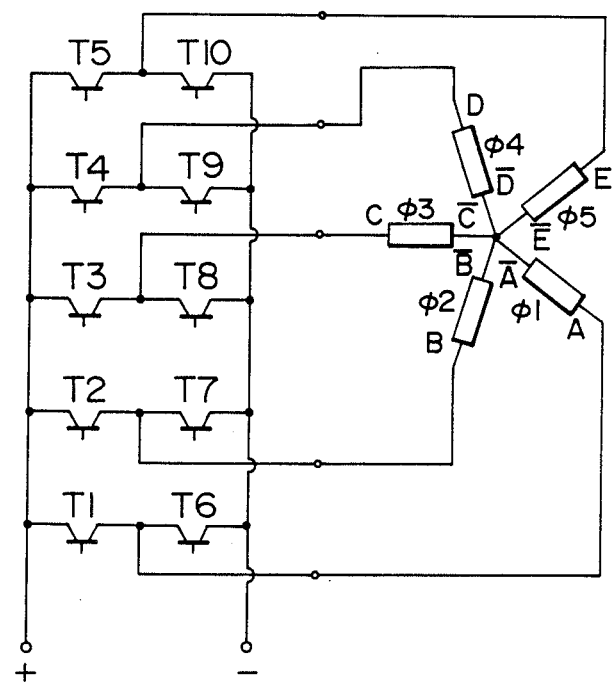
FIG. 23 is a circuit diagram of a driving circuit for a five-phase stepping motor including phase-windings connected in the form of star.
Figures 24, 25:
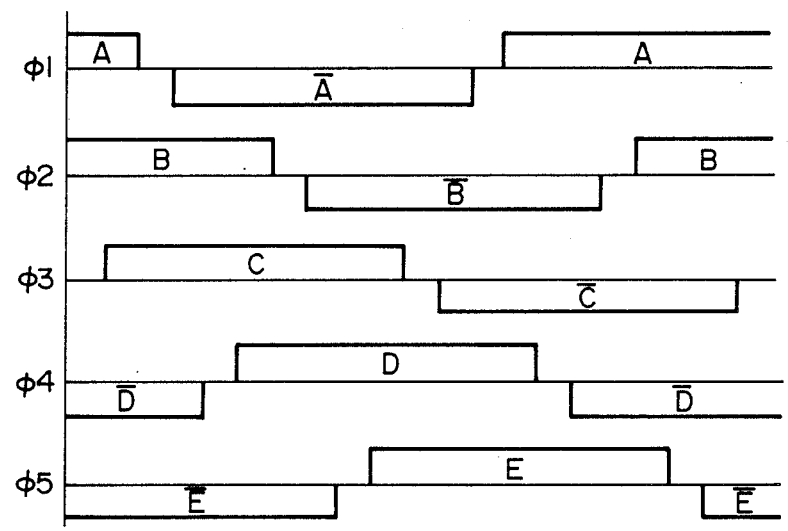
FIG. 24 is a timing chart showing conductive states of switching elements for each step in the driving circuit of FIG. 23.
FIG. 25 is a timing chart showing excitation state of phase-windings of the five-phase stepping motor corresponding to the conductive states of FIG. 24.

FIGS. 15 and 16 are timing charts showing operation of the sixth embodiment of the invention. In FIGS. 15 an 16, in step 1, the switching elements T1 and T9 are turned on to connect the winding terminal A to the positive pole of the power source and connect the winding terminal D to the negative pole so that the so-called two-phase excitation state is formed. Then, when the state of the circuit proceeds to step 2, the switching elements T1, T2 and T9 are turned one to connect the winding terminals A and B to the positive pole of the power source and connect the winding terminal to the negative pole of the power source so that the three-phase excitation state is formed. Further, in step 3, the switching elements T2 and T9 are turned on to connect the winding terminal B to the positive pole of the power source and connect the winding terminal D to the negative pole so that the two-phase excitation state is formed again. Thus, the two-phase and three-phase excitation states are alternately repeated in the following steps 4 to 20 in the same manner. FIG. 17 shows the excitation states for each of steps 1 to 4. It will be appreciated from FIG. 17 that the total number of the terminals connected to the positive and negative pole of the power source is two in step 1, three in step 2, two in step 3, and so on, and accordingly, the total number is two or three alternately and repeatedly each time an input pulse is supplied. FIG. 18 is a vector diagram of torque produced when the common constant current drive is effected by the driving circuit thus configured. As apparent from FIG. 18, the composite torque vector is rotated by 18 degrees in an electric angle for each step so that the so-called half-step driving is achieved. It will be appreciated that a ratio of the produced torques is equal to 1.05 and can be suppressed to the value smaller than the ratio of 1.14 which is the ratio in the four-and-five-phase excitation state.

We claim:

1. For a five-phase stepping motor energizable by a power source having a positive pole and a negative pole, with the motor including five phase-windings each having a starting end and a terminating end in which each of the starting ends of one phase-winding is successively connected at a junction to each of the terminating ends of another phase winding to form a ring, a driving circuit, comprising:
a plurality of pairs of switching means connected in series to each other, each of said pairs including a connection therebetween,
said connections each being connected to one of the junctions between the phase-windings,
one of each pair of the switching means being connected to the positive pole of the power source and the other of each pair of the switching means being connected to the negative pole of the power source so that the switching means can be turned on and off to connect the junctions to a pole of the power source,
pulsing means responsive to input pulses for actuating said switching means and turning the switching means on and off in one of two sequences, the first of the sequences being such that at each pulse the switching means connect a total number of four junctions to the poles of the power source and the other of the other of said sequences includes two alternately repeated states in one state of which the switching means connect a total number of three junctions to the poles of the power source and in another state of which the switching means connect a total number of four junctions to the poles of the power source.

2. For a five-phase stepping motor energizable by a power source having a positive pole and a negative pole, with the motor including five phase-windings each having a starting end and a terminating end in which each of the starting ends of one phase winding is successively connected at a junction to each of the terminating ends of another phase winding to form a ring, a driving circuit, comprising:
- a plurality of pairs of switching means with the switching means in each pair connected in series to each other each of said pairs including a connection therebetween,
- said connection being connected to each of junctions between the phase-windings,
- one of each pair of the switching means being connected to the positive pole of the power source and the other of each pair of the switching means being connected to the negative pole of the source so that the switching means can be turned on and off to connect the junctions to a pole of the power source and to disconnect the junctions from a pole of the power source,
- pulsing means responsive to input pulses for turning the switching means on and off in one of two sequences so that at each pulses, in one of the sequences two of the junctions connect to the positive pole of the power source and other two of the junctions connect to the negative pole of the power source with a remaining junction being unconnected to both the poles of the power source,
- in the other of said sequences, said pulsing means having two alternately repeated states, one state being such that the two phase-windings each having an end connected to the remaining junction connect to the same positive pole of the power source and another state in which the two phase-windings each having the other end connected to the remaining junction are connected to the same negative pole of the power source.

3. For a five-phase stepping motor energizable by a power source having a positive pole and a negative pole, with the motor including five phase-windings each having a starting end and a terminating end in which each of the starting ends of one phase winding is successively connected at a junction to each of the terminating ends of other phase windings to form a ring,
a driving circuit, comprising:
- a plurality of pairs of switching means, the switching means of each pair being connected in series to each other and including a connection therebetween each connected to one of junctions between the phase-windings,
- each pair of the switching means being connected to the positive pole of a driving power source and the other of each pair of the switching means is connected to the negative pole of the power of the switching means can be turned on and off to connect the junctions to the positive and negative pole of the power source and not to connect the junctions to any pole of the power source,
- pulsing means connected to a source of pulses for turning the switching means on and off so that two of the junctions connect to the positive pole of the power source and two others of the junctions connect to the negative pole of the power source with a remaining junction being unconnected to both the poles of the power source while one of the ends of two phase-windings each having and end connected to the remaining junction connects to the positive pole of the power source and the other of the ends of the two phase-windings connected to the remaining junction connects to the negative pole of the power source.

4. For a five-phase stepping motor energizable by a power source having a positive and a negative pole, with the motor including five phase-windings each having a starting end and a terminating end in which each of the starting ends of one phase-winding is successively connected at a junction to each of the terminating ends of another phase-winding to form a ring,
a driving circuit, comprising:
- a plurality of pairs of switching means, the switching means of each pair being connected in series to each other and including a connection therebetween connected to each of junctions between the phase-windings,
- each pair of the switching means being connected to the positive pole of a driving power source and the other of each pair of the switching means is connected to the negative pole of the source so that switching means can be turned on and off to connect the junctions to the positive and negative pole of the power source and not to connect the junctions to any pole of the power source,
- pulsing means connected to a source of pulses for turning the switching means on and off so that two of the junctions are connected to the positive pole of the power source and two others of the junctions connect to the negative pole of the power source with a remaining junction being unconnected to both the poles of the power source,
- said pulsing means having two states, one for connecting an end of two phase-windings each having another end connected to the remaining junction to the same pole of the power source,
- said pulsing means having the other state for connecting and end of two phase-windings each having the other end connected to the remaining junction to the positive pole of the power source and the other of one ends of two phase-windings to the negative pole of the power source,
- said pulsing means being arranged for alternately repeating said states at successive pulses.

5. For a five-phase stepping motor energizable by a power source having a positive and a negative pole, with the motor including five phase-windings each having one end connected to common junction,
a driving circuit, comprising:
- a plurality of pairs of switching means, the switching means of each pair being connected separately to each of the other ends of the phase-windings for selectively connecting the other ends to the positive pole and the negative pole of the power source and leaving the end unconnected to any pole of the power source,
- pulsing means connected to a source of pulses for turning the switching means on and off to create one of two conditions in response to an input impulse, the first of the conditions being that the total number of the other ends connected to a pole of the power source is equal to three,
- the second of the two conditions having two alternately repeated states in response to an input pulse, one state in which the switching means connects a total number of other ends equal to three and the other state in which the switching means connects a total number of other ends equal to four.

6. A driving circuit for a five-phase stepping motor energizable by a power source having a positive and a negative pole, with the motor including five phase-windings each having one end connected in common and another end a plurality of switching means each connected separately so that each of the other ends of the phase-windings connects to a pole of a power source through the switching means or does not connect to any pole of the power source, pulsing means connected to a source of pulses for turning the switching means on and off to create one of two conditions in response to an input pulse, the first of the conditions being that the total number of the other ends connected to a pole of the power source is equal to one of two and three, the second of the two conditions having two alternately repeated states in response to an input pulse one state in which the switching means connects a total number equal to two and the other state in which the switching means connects a total number equal to three alternately repeated each time an input pulse is supplied.

* * * * *